(12) United States Patent
Trinschek et al.

(10) Patent No.: US 9,386,638 B2
(45) Date of Patent: Jul. 5, 2016

(54) AUTONOMOUS EMERGENCY LIGHT UNIT FOR AN AIRCRAFT AND EMERGENCY LIGHTING SYSTEM COMPRISING SUCH LIGHT UNIT

(71) Applicant: Goodrich Lighting Systems GmbH, Lippstadt (DE)

(72) Inventors: Robert Trinschek, Hamm (DE); Sascha Kueckelmann, Lippstadt (DE); Christoph Kallfass, Schwaebisch Hall (DE); Andre Hessling Von Heimendahl, Koblenz (DE)

(73) Assignee: GOODRICH LIGHTING SYSTEMS GMBH (DE)

( * ) Notice: Subject to any disclaimer, the term of this patent is extended or adjusted under 35 U.S.C. 154(b) by 0 days.

(21) Appl. No.: 14/504,800

(22) Filed: Oct. 2, 2014

(65) Prior Publication Data
US 2015/0108895 A1 Apr. 23, 2015

(30) Foreign Application Priority Data
Oct. 2, 2013 (EP) .................................. 13187030

(51) Int. Cl.
*H05B 37/00* (2006.01)
*H05B 33/08* (2006.01)
(Continued)

(52) U.S. Cl.
CPC .......... *H05B 33/0803* (2013.01); *B60Q 3/0256* (2013.01); *B60Q 3/0259* (2013.01); *B64D 11/00* (2013.01); *B64D 25/00* (2013.01); *F21S 9/022* (2013.01); *H02J 9/02* (2013.01); *F21V 23/0492* (2013.01); *G08B 7/062* (2013.01)

(58) Field of Classification Search
CPC .......... H05B 37/02; H05B 33/08; H60Q 1/14; H60Q 3/0259

USPC ............... 315/85, 86, 87, 119, 120, 129, 177, 315/291, 294, 312, 77
See application file for complete search history.

(56) References Cited

U.S. PATENT DOCUMENTS

| | | | |
|---|---|---|---|
| 4,365,232 A | 12/1982 | Miller | |
| 5,739,639 A * | 4/1998 | Johnson | H02J 9/061 307/64 |
| 6,203,180 B1 | 3/2001 | Fleischmann | |
| 7,573,396 B2 * | 8/2009 | Stokes | 340/693.2 |
| 2005/0141226 A1* | 6/2005 | Wisch et al. | 362/470 |

(Continued)

FOREIGN PATENT DOCUMENTS

| | | |
|---|---|---|
| EP | 2680673 A1 | 1/2014 |
| WO | 2012115173 A1 | 8/2012 |

OTHER PUBLICATIONS

European Search Report for Application No. 13187030.5-1810, Mailed on Apr. 7, 2014. 8 pages.

*Primary Examiner* — Tung X Le
(74) *Attorney, Agent, or Firm* — Cantor Colburn LLP

(57) ABSTRACT

An autonomous emergency light unit for an aircraft has a power input for receiving power from an external power supply, a rechargeable power source, at least one LED for illuminating the emergency light unit, and a light unit control logic configured to operate the emergency light unit in a plurality of operating states as a response to external control information received and processed by the light unit control logic. The plurality of operating states includes a discharge and illumination state, with the rechargeable power source being discharged over the at least one LED in the discharge and illumination state. The light unit control logic is configured to operate the emergency light unit in the discharge and illumination state as a response to no power being provided at the power input.

15 Claims, 3 Drawing Sheets

(51) Int. Cl.
  *B60Q 3/02* (2006.01)
  *B64D 25/00* (2006.01)
  *F21S 9/02* (2006.01)
  *B64D 11/00* (2006.01)
  *H02J 9/02* (2006.01)
  *F21V 23/04* (2006.01)
  *G08B 7/06* (2006.01)

(56) References Cited

U.S. PATENT DOCUMENTS

2009/0261732 A1\* 10/2009 Bouchard ............. B60Q 11/00
  315/82
2010/0033980 A1  2/2010 Vogel et al.
2011/0068692 A1  3/2011 Tian \* cited by examiner

AUTONOMOUS EMERGENCY LIGHT UNIT FOR AN AIRCRAFT AND EMERGENCY LIGHTING SYSTEM COMPRISING SUCH LIGHT UNIT

CROSS REFERENCE TO RELATED APPLICATIONS

This application claims priority to European Patent Application No. 13 187 030.5 filed Oct. 2, 2013, the entire contents of which is incorporated herein by reference.

TECHNICAL FIELD

The invention relates to emergency lighting in aircraft. In particular, it relates to emergency light units used in emergency lighting in aircraft and to emergency lighting systems employing such emergency light units.

BACKGROUND

Almost all aircraft have emergency lighting systems. For example, passenger aircraft have a number of emergency lights, such as emergency exit signs, light strips on the floor, emergency slide lights, etc. These emergency lights are part of an emergency lighting system.

FIG. 1 shows a conventional emergency lighting system 900 in a schematic form. The emergency lighting system 900 has 3 emergency power supplies 950, coupled between a power supply line 904 and ground 906. The emergency power supplies 950 are further coupled to a trigger line 960, through which an emergency signal can be transmitted. This emergency signal triggers emergency operation of the emergency power supplies 950. Upon receiving this trigger signal, each of the emergency power supplies 950 supplies power to various emergency lights 902, which light up. For redundancy reasons, some of the emergency lights 902 are provided with power from more than one emergency power supply 950.

In modern air planes, the wiring efforts for such emergency lighting systems have become unacceptable. Accordingly, it would be beneficial to provide an emergency light unit that allows for the wiring of the emergency lighting system to be reduced. Further, it would be beneficial to provide an emergency lighting system with reduced wiring.

SUMMARY

Exemplary embodiments of the invention include an autonomous emergency light unit for an aircraft, the emergency light unit comprising a power input for receiving power from an external power supply, a rechargeable power source, at least one LED for illuminating the emergency light unit, and a light unit control logic configured to operate the emergency light unit in a plurality of operating states as a response to external control information received and processed by the light unit control logic. The plurality of operating states comprises a discharge and illumination state, with the rechargeable power source being discharged over the at least one LED in the discharge and illumination state. The light unit control logic is configured to operate the emergency light unit in the discharge and illumination state as a response to no power being provided at the power input.

The provision of the rechargeable light source within the emergency light unit allows for a reduction of redundancy in the wiring of an emergency lighting system. The prior art requires multiple power paths to at least some of the individual emergency lights, such that a sufficient amount of emergency lighting is ensured for any given breaking point of the power wires of the emergency lighting system. In contrast thereto, the present invention provides autonomous emergency light units that are charged during normal operation of the aircraft and are self-sufficient in case of an emergency, such as a plane crash. The inventive emergency light units do not rely on the wiring of the emergency lighting system in the emergency situation. Accordingly, one connection to a power source is sufficient for the emergency light unit to charge during normal operation and to safely operate in the emergency situation, independent from any damage to the wiring of the emergency lighting system. Moreover, for any number and location of wiring damages, the present invention still ensures the functioning of all emergency light units during the emergency situation. This feature is impossible to achieve with the conventional wiring, no matter how high the redundancy is. Also, by providing rechargeable power sources per light unit, the system capacities may be adapted better to the power needs of the individual light units. The autonomous emergency light unit of the invention allows for the provision of decentralized, reliable and efficient emergency lighting system.

The rechargeable power source is discharged over the at least one LED, thereby illuminating the emergency light unit, when no power is available at the power input. In other words, the autonomous emergency light unit interprets the absence of power supply as an indication that damage to the emergency lighting system occurred, which in turn is an indication that an emergency situation is present. In yet other words, the state of no power being provided at the power input is used as a piece of information indicating that the external power supply is interrupted or that the wiring to the external power supply is damaged. The energy stored in the rechargeable power source is used to illuminate the emergency light unit in an autonomous manner.

It is pointed out that the light unit control logic may be configured to operate the emergency light unit in the discharge and illumination state additionally in situations different from the situation of no power being provided at the power input. For example, it is possible that the light unit control logic expects a number of predefined power supply states at the power input. Any power supply state that does not fall into one of the predefined power supply states may be interpreted as an emergency state, which leads to the light unit control logic triggering the discharge and illumination state. For example, there may be a predefined voltage threshold, above which the light unit control logic assumes normal operation and below which the light unit control logic assumes emergency operation, although some amount of power may still be received. In any case, the event of no power being provided leads to the discharge and illumination state. In other words, the light unit control logic may be configured to operate the emergency light unit in the discharge and illumination state as a response to the power input being in an emergency state, said emergency state of the power input including at least the state of no power being provided at the power input.

The expression "no power being provided at the power input" does not necessarily relate to the absence of power flow. It rather relates to the situation where the autonomous emergency light unit cannot draw power at the power input from the outside of the emergency light unit. In other words, if the emergency light unit has the option to draw power through the power input, then there is power provided at the power input and the state of "no power being provided at the power input" is not present. In yet other word, the expression refers to the question whether or not a functioning power supply is present. For example, a certain voltage at the power input may indicate the potential to draw power, independent from the actual power flow at that point in time.

The expression "configured to operate the emergency light unit in a plurality of operating states as a response to external control information" does not mean that a plurality of operating states are present at one time. To the contrary, the light unit control logic operates the emergency light unit in one particular operating state at any given time. The selection of the particular operating state is determined on the basis of the external control information.

The autonomous emergency light unit may be any kind of aircraft emergency light. Concrete examples are exit sign lights over the exits, exit locator sign lights in the aisles, exit illumination lights for allowing the passengers to pass the exit, emergency slide lights, overwing escape lights, light strips on the floor, other emergency guide lights, etc.

According to a further embodiment, the light unit control logic is configured to sense the power provided at the power input, with a modulation of the power provided at the power input representing the external control information. In other words, the light unit control logic is configured to operate the emergency light unit in a plurality of operating states as a response to the modulation of the power provided at the power input. In this way, the power input is simultaneously used as a control information input. One input is sufficient for the autonomous emergency light unit to receive power and external control information. Accordingly, only one connection to a power supply controller of the emergency lighting network is necessary for the autonomous emergency light unit to be provided with power and control information. This again helps in reducing the wiring of the emergency lighting system. The emergency light unit's ability to process power and control information from one input results in a reduction of wiring for the emergency lighting system.

The term "modulation" refers to any kind of variation of the power over time. The external control information may be contained in a predefined momentary state or in a predefined course over time. For example, a particular voltage level of the power may be a particular command from the power supply controller to the light unit control logic. In other words, different voltage levels of the power may indicate different desired behaviors of the emergency light unit. It is also possible that a particular voltage sequence, such as a predefined voltage pulse, may be a particular command from the power supply controller to the light unit control logic. In any case, a time variation of the power at the power input is a suitable way of providing the external control information to the emergency light unit.

According to a further embodiment, the light unit control logic is configured to receive external control information through a separate control information channel. The control information channel is an additional input to the emergency light unit, namely in addition to the power input for receiving power. The control information channel is provided for receiving the external control information in the form of an external control signal. The control information channel may be a wired communication channel, such as an electric wire or an optical connection, or a wireless communication channel, with the emergency light unit having an according receiver. The provision of control information through the separate control information channel may be in addition or as an alternative to the provision of control information via the modulation of the power provided at the power input. For example, it is possible that some control commands are received via the modulation of the received power, while other control commands are received via the separate control information channel. It is also possible to receive certain commands through both the power modulation and the separate control information channel for redundancy purposes. In any case, the light unit control logic, upon detecting a state of no power being provided at the power input, operates the emergency light unit in the discharge and illumination state.

According to a further embodiment, the rechargeable power source is a capacitor. In that case, the autonomous emergency light unit does not comprise a rechargeable battery. Capacitors are very suitable devices for the rechargeable power source, as they have a very long life time. Conventional batteries, which are commonly used in emergency power supplies of prior art emergency lighting systems, such as the one shown in FIG. 1, have a fairly short life time compared to the common life time of a passenger airplane. Usually, the batteries of the emergency lighting system are exchanged every two years. The provision of capacitors in the autonomous emergency light units makes the rechargeable power storage devices of the emergency lighting system virtually maintenance-free. In this way, the autonomous emergency light units ensure shorter maintenance times, requiring the air plane to be on the ground for shorter times. Also, capacitors comprise less hazardous materials than conventional batteries, have less safety issues than conventional batteries and have a larger temperature range than conventional batteries.

It is possible that the autonomous emergency light unit comprises a plurality of capacitors for electrical energy storage. The plurality of capacitors may be connected in parallel or in series or in a combined parallel and series connection. The space-efficiency of LED's allows for the whole autonomous emergency light unit to be space-efficient, even when capacitors are used as rechargeable power sources.

It is pointed out that it is also possible that the rechargeable power source is a so-called hybrid capacitor. Hybrid capacitors have many of above discussed beneficial properties of capacitors. An example of such a hybrid capacitor is a lithium-ion capacitor. It is, however, also possible that the rechargeable power source is a rechargeable battery.

According to a further embodiment, the rechargeable power source has a sufficient energy storing capacity to illuminate the at least one LED for at least 10 minutes, more preferably for at least 15 minutes, and even more preferably for at least 20 minutes. In this way, the illumination of the emergency light unit is ensured for the duration of a "typical" or expected emergency situation. This time frame is long enough to let the passenger disembark the aircraft in such an emergency situation.

According to a further embodiment, the plurality of operating states comprises a charge and illumination state, with the rechargeable power source being charged and the at least one LED being illuminated with the power received at the power input in the charge and illumination state, and wherein the light unit control logic is configured to operate the emergency light unit in the charge and illumination state as a response to external control information comprising a charge and illumination command The power from the power input is used to both charge the rechargeable power source and illuminate the at least one LED. It is possible that the power is split up between the at least one LED and the rechargeable power source. But it is also possible that the at least one LED draws the power from the rechargeable power source, with the rechargeable power source being constantly charged with the received power. The charge and illumination state allows for ensuring a charged state of the rechargeable power source, while at the same time illuminating the emergency light unit. The cabin crew may operate an according switch at the beginning of boarding. In this way, the passengers are shown the location of the exits through the illumination of the emergency lights when they come aboard the aircraft. Also, the boarding time is used for ensuring the rechargeable power source to be in a fully charged state.

It is pointed out that the expression "with the rechargeable power source being charged" does not necessarily require a continuous power flow to the rechargeable power source. It is sufficient to maintain the rechargeable power source in a charged state. Accordingly, this expression encompasses the charging to a desired state as well as the maintenance of the desired state. This maintenance of the desired state of charge may be achieved by periodic energy pulses or by re-charging upon a sensed level of discharge or by any other suitable means.

According to a further embodiment, the plurality of operating states comprises an armed and charge state, with the rechargeable power source being charged with the power received at the power input in the armed and charge state, and wherein the light unit control logic is configured to operate the emergency light unit in the armed and charge state as a response to external control information comprising an armed and charge command. The armed and charged state represents a state where a desired state of charge of the rechargeable power source is maintained and where the emergency light unit is in an armed state, i.e. in a state of alert, where it can start the illumination of the at least one LED at any point. This state may be the default state during flight. The emergency light unit is ready to perform its emergency situation function at any time.

It is also possible that the plurality of operating states comprises an armed state, wherein the light unit control logic is configured to operate the emergency light unit in the armed state as a response to external control information comprising an armed command The armed state may be available in addition or as an alternative to the armed and charge state. It is possible that the rechargeable power source maintains its state of charge so well that no charging during the armed state is desired. In that case, the emergency light unit may just assume a state of being ready to perform its emergency situation function.

According to a further embodiment, the autonomous emergency light unit further comprises an aircraft crash sensor coupled to the light unit control logic, wherein the plurality of operating states comprises a sensed crash state, with the rechargeable power source being charged and the at least one LED being illuminated with the power received at the power input in the sensed crash state, and wherein the light unit control logic and the aircraft crash sensor are configured to operate the emergency light unit in the sensed crash state as a response to external control information comprising the armed and charge command and the aircraft crash sensor sensing a crash behavior characteristic. In this way, the emergency light unit is independent from any external control information indicating a crash. The emergency light unit includes its own trigger for illuminating the at least one LED. In this way, the emergency light unit is more reliable to function properly in a crash situation. In addition to being able to sense a crash and to illuminate the at least one LED, the emergency light unit uses the power provided at the power input as long as possible. In other words, as long as the power supply at the power input works, the emergency light unit does not rely on its own rechargeable power source. As discussed above, when no power supply is available at the power input, the emergency light unit enters the discharge and illumination state, where the at least one LED is illuminated by the rechargeable power source.

The aircraft crash sensor may be coupled to the light unit control logic, outputting a sensor signal indicative of a crash, such that the light unit control logic may react to that signal. It is also possible that the aircraft crash sensor is coupled to a switch between the light unit control logic on the one hand and the rechargeable power source and the at least one LED on the other hand.

According to a further embodiment, the aircraft crash sensor is an acceleration sensor. The emergency light unit may be configured to enter the sensed crash state at an acceleration of more than 30$g$, which indicates a crash. The acceleration sensor may be configured to constantly report the acceleration to the light unit control logic or may be configured to close an associated switch upon the exceeding of a predefined acceleration. It is pointed out that the aircraft crash sensor may also be a different kind of sensor that is suitable for providing an indication of a crash. Examples are speed sensors, temperature sensors, etc.

According to a further embodiment, the plurality of operating states comprises a shut down state, with the rechargeable power source being discharged via a power dissipation circuit in the shut down state, and wherein the light unit control logic is configured to operate the emergency light unit in the shut down state as a response to external control information comprising a shut down command. The power dissipation circuit may have a power dissipating element, such as a resistor, through which the rechargeable power source can be discharged. In this way, the autonomous emergency light unit can be brought into a safe, fully discharged state, when no emergency is to be expected, such as during the parking of the aircraft over night.

According to a further embodiment, the autonomous emergency light unit further comprises a power conditioning module coupled between the rechargeable power source and the at least one LED, the power conditioning module being adapted to provide power from the rechargeable power source to the at least one LED with suitable power characteristics. The suitable power characteristics may comprise one or more of a suitable voltage or a suitable current, depending on the arrangement of the at least one LED. The power conditioning module may allow for a controlled discharge of the rechargeable power source, which results in the illumination of the at least one LED lasting the desired amount of time.

According to a further embodiment, the at least one LED is a plurality of LEDs. By providing a plurality of LED's, the light capacity and the color of the autonomous emergency light unit may be put in a desired range. Also, manufacturing tolerances may be evened out by providing a plurality of LED's. The plurality of LED's may be coupled in series or in parallel or in a combination of series and parallel connections.

According to a further embodiment, the autonomous emergency light unit further comprises a charge status sensor coupled to the rechargeable power source for sensing a charge status thereof and a charge status indicator coupled to the charge status sensor and configured to indicate the charge status of the rechargeable power source, the charge status indicator being one of a display device and a signal generator coupleable to an external status signal channel. The display device may be one LED or a plurality of LED's or a screen or any other suitable optical device for conveying the charge status. In particular, the display device may convey an optical alarm if the charge status is below a predefined threshold. The signal generator may be a wired electrical or optical signal generator or a wireless signal generator. The status signal channel may convey the charge status information to the outside of the emergency lighting systems, such as to maintenance personal in a test operation or to the flight crew during normal operation of the aircraft.

According to a further embodiment, the autonomous emergency light unit further comprises a temperature conditioning module for maintaining a predefined temperature range within the autonomous emergency light unit. In this way, the proper functioning of the autonomous emergency light unit is ensured, even in demanding conditions such as present for outside emergency lights, for example emergency slide lights. The temperature conditioning module may be a heating module or a cooling module.

Exemplary embodiments of the invention further include an emergency lighting system for an aircraft, comprising a power supply line and a plurality of autonomous emergency light units, as described in any of the embodiments above, wherein the plurality of autonomous emergency light units are coupled to the power supply line with their respective power inputs. Above modifications and advantages equally relate to the emergency lighting system. In particular, the emergency lighting system may have a power supply controller adapted to provide power and external control information in such a way to the autonomous emergency light unit that it is able to process the provided power and external control information as discussed above.

According to a further embodiment, the emergency lighting system further comprises a power supply controller configured to provide modulated power on the power supply line, with the modulated power carrying the external control information in its modulation.

Exemplary embodiments of the invention further include an aircraft, such as a plane or a helicopter or a spacecraft, comprising at least one emergency lighting system, as described in any of the embodiments above. Above modifications and advantages equally relate to the aircraft. An aircraft may have a plurality of above described emergency lighting systems, each of them being responsible for a certain part of the aircraft and/or for certain kinds of emergency lights, such that above described emergency lighting systems are subsystems of the overall emergency lighting system. However, it is also possible that the aircraft has exactly one emergency lighting system.

Embodiments of the invention are described in greater detail below with reference to the Figures.

DETAILED DESCRIPTION

Figure 1:
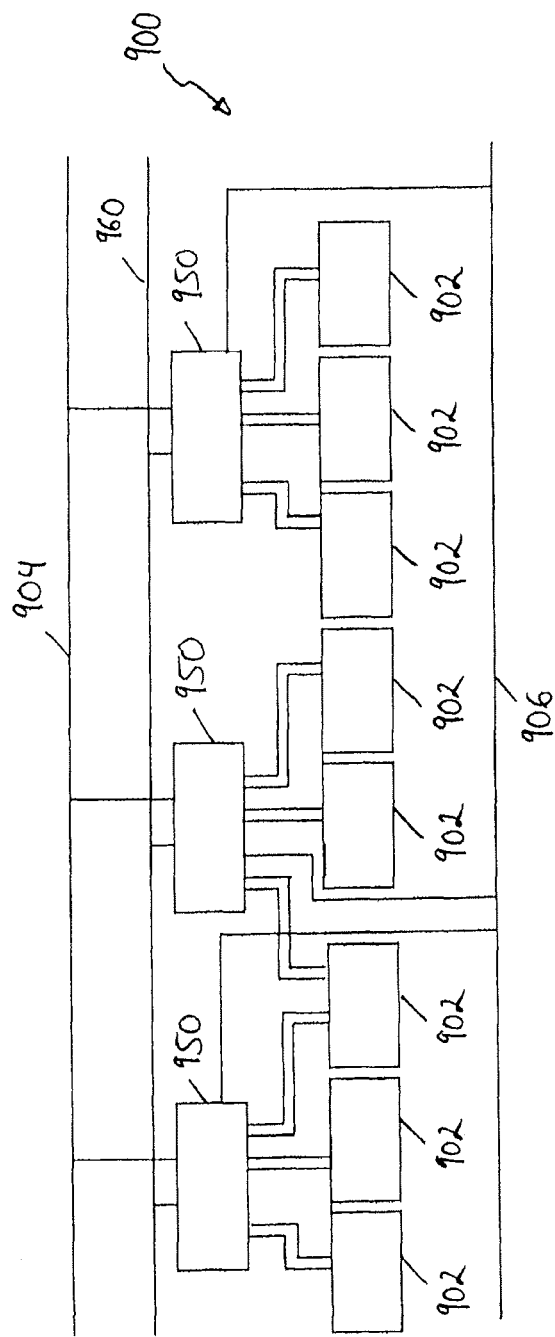
FIG. 1 shows a block diagram of a prior art emergency lighting system.
Figure 2:
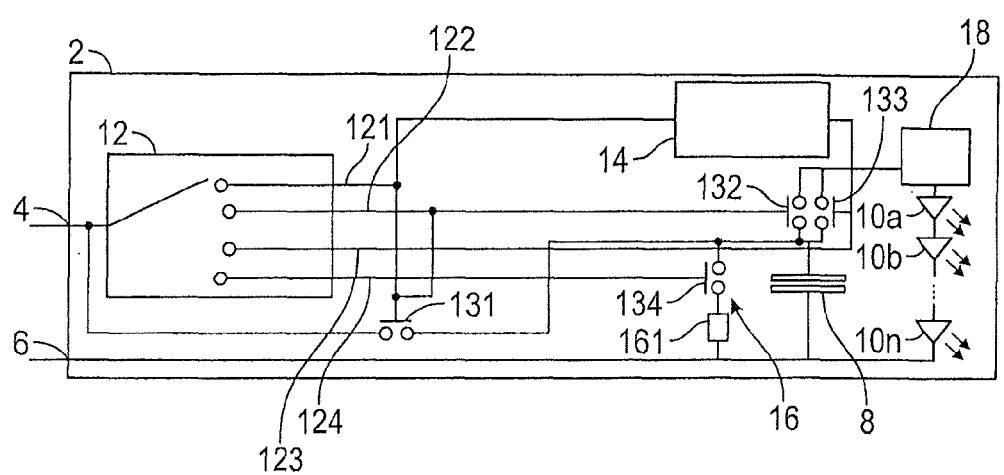
FIG. 2 shows a combined block and circuit diagram of an exemplary autonomous emergency light unit in accordance with the invention.

FIG. 2 shows an exemplary autonomous emergency light unit 2 in accordance with the invention. FIG. 2 is part block diagram, part circuit diagram.

The light unit has two external terminals, namely a power input 4 and a ground terminal 6. The power input 4 is provided for being coupled to a power supply controller of the emergency lighting system, discussed below. The ground terminal 6 may be coupled to any suitable ground structure in an aircraft, such as a ground terminal of the emergency lighting system or other available ground rail.

A capacitor 8 is coupled between the ground terminal 6 and the power input 4, wherein the power input 4 is coupled to the positive plate of the capacitor 8 via a first switch 131. The positive plate of capacitor 8 is further coupled to a power conditioning module 18 via the second and third switches 132 and 133, which are coupled in parallel to each other. The power conditioning module 18 is coupled to the ground terminal 6 via a series connection of n LEDs (of which are shown the LEDs 10a, 10b and 10n). In other words, the positive plate of the capacitor 8 forms a positive voltage point of the light unit 2, which is coupled to ground through the second and third switches 132 and 133, the power conditioning module 18, and the n LEDs 10a, 10b, . . . , 10n.

The positive plate of the capacitor 8 is further coupled to ground via a power dissipation circuit 16, the power dissipation circuit 16 comprising a fourth switch 134 and a resistor 161.

The power input 4 is further coupled to a light unit control logic 12. The light unit control logic 12 has four outputs 121, 122, 123, and 124. These four outputs 121-124 are coupled to and control the switches 131, 132, 133 and 134. In particular, the first output 121 controls the first switch 131. The second output 122 controls both the first switch 131 and the second switch 132. The third output 123 controls the third switch 133. The fourth output 124 controls the fourth switch 134. The first output 121 of the light unit control logic 12 is further coupled to a crash sensor 14. The crash sensor 14 is further coupled to and controls the third switch 133.

The operation of the light unit control logic 12 and of the whole autonomous emergency light unit 2 will be described as follows. The light unit control logic 12 has one input, coupled to the power input 4, and the four outputs 121-124, discussed above. The light unit control logic 12 interprets the behaviour of the power input as an external control signal carrying external control information. On the basis of this external control information, the light unit control logic 12 decides between four operating states of the light unit 2. For each of these operating states, the light unit control logic 12 outputs an according control signal on exactly one of the four outputs 121-124, which results in the switching of according switches, as will be explained below.

This behavior of interpreting the power input as external control information and transforming that control input into exactly one output control signal is illustrated schematically by the four way switch shown in the box of the light unit control logic 12 of FIG. 2. It is apparent to the skilled person that numerous implementations of the control logic 12 are possible. The control logic may be implemented in hardware or software or a combination thereof.

The operating states of the autonomous emergency light unit 2 are described as follows, with the "normal" operating states described first and the emergency operation described thereafter. During boarding of an aircraft, the cabin crew usually operates a switch in the cabin for turning on the emergency lighting, such that the passengers get accustomed to the emergency equipment of the aircraft during boarding. Upon reception of the signal from the cabin crew, a power supply controller of the emergency lighting system, which will be described below, applies a 12V power supply to the power input 4 of the light unit 2. The light unit control logic 12 interprets power with a voltage of 12V as a charge and illumination command and sets the second output 122 to a logical high. This logical high of the second output 122 closes the first switch 131 and the second switch 132. In this way, the power input 4 becomes connected to the positive plate of the capacitor 8, charging the same. The power input 4 also becomes connected to the power conditioning module 18 and the LEDs 10a-10n. In this way, the power received at the power input 4 both charges the capacitor 8 and illuminates the light unit 2 by sending a current through the LEDs 10a-10n.

After boarding and before take-off, the pilot usually operates a cockpit switch setting the emergency lighting system in an alert mode. As a response thereto, the power supply controller applies a 28 V power supply to the power input 4 of the light unit 2. The light unit control logic 12 interprets the power supply with a voltage of 28V as an armed and charge command and sets the first output 121 to a logical high. This logical high on the first output 121 closes the first switch 131, which in turn couples the positive plate of the capacitor 8 to the power input 4, resulting in a charging of the capacitor 8. The first output 121 also triggers the crash sensor 14 to enter an operational state where it constantly monitors one or more parameters indicative of a crash, such as the aircraft acceleration.

During a normal flight, the autonomous emergency light unit 2 stays in the armed and charge state, wherein the desired charge on the capacitor 8 is constantly maintained and the crash sensor 14 is constantly monitoring the aircraft acceleration. As usually no emergency occurs during a regular flight, the aircraft lands with the light unit 2 being in the armed and charge state.

The autonomous emergency light unit 2 may additionally have a charge conditioning module (not shown), interposed either between the power input 4 and the first switch 131 or between the first switch 131 and the positive plate of the capacitor 8. This charge conditioning module may ensure equal charging of the capacitor 8, irrespective of the voltage level of the power input 4. Accordingly, in above described example, the charge conditioning module may effect equal or similar charging of the capacitor 8 for the power input having 12V or 28V.

As the pilot shuts down the aircraft, he commonly sends a shut down signal to the emergency lighting system. As a response thereto, the power supply controller sends a short negative pulse at −12V to the power input 4. The light unit control logic 12 interprets said negative pulse as a shut down command and puts the fourth output 124 to a logical high state. This logical high state closes the fourth switch 134, which effects the power dissipation circuit 16 to establish a conductive path between the positive plate of the capacitor 8 and ground. The charge of the capacitor 8 results in a current through the power dissipation circuit 16, by which the capacitor 8 is discharged and the stored energy is converted into heat in the resistor 161. Accordingly, the light unit 2 is brought into an off-state.

In case of an emergency, the autonomous emergency light unit 2 may assume two more operating states. A crash of the aircraft without power loss at the power input may lead to a sensed crash state. As discussed above, the default flight operating state is the armed and charge state, in which the first output 121 of the light unit control logic is at a logical high. If the crash sensor 14 then detects a crash, e.g. because of the aircraft acceleration exceeding 30g, the crash sensor 14 closes the third switch 133. In this way, the positive plate of the capacitor 8 is coupled to the LEDs 10a-10n through the power conditioning module 18. This in turn leads to a lighting up of the LEDs 10a-10n and an illumination of the autonomous emergency light unit 2. As power supply is still present at power input 4, the closed state of the first switch 131 still allows for a re-charging of the capacitor 8 and for a maintaining of the positive plate of the capacitor 8 at a desired voltage level.

A second kind of emergency leads to a discharge and illumination state of the autonomous emergency light unit 2. This second kind of emergency is indicated by no power being supplied to the power input 4. The situation of a lack of power supply indicates that the power wiring of the emergency lighting device is broken, such as in case of an aircraft fuselage breaking during a crash. The light unit control logic 12 interprets said lack of power supply as an emergency condition and sets the third output 123 to a logical high. This logical high closes the third switch 133, in which case the positive plate of the capacitor 8 is coupled to the LEDs 10a-10n through the power conditioning module 18. No re-charging of the capacitor 8 takes place.

The power conditioning module may be a current conditioning module, providing for a pre-defined current through the LEDs 10a-10n. This predefined current allows for the LEDs 10a-10n to jointly achieve a desired illumination of the light unit 2. The power conditioning module is configured to keep the current through the LEDs 10a-10n constant, independent from its input voltage. In this way, the power conditioning module 18 ensures for a continuous illumination of the light unit 2 despite the voltage at the positive plate of the capacitor 8 decreasing due to the ongoing discharge via the LEDs 10a-10n.

It is also possible that the cockpit crew or the cabin crew, upon foreseeing an emergency, activates a switch for turning the emergency lights on. In that case, the autonomous emergency light unit will assume the charge and illumination state, as discussed above with respect to the boarding situation.

Each of the first to fourth outputs 121-124 of the light unit control logic 12 closes one or more of the first to fourth switches 131-134. Just for completeness, it is pointed out that all switches, not being closed by the one output that is set to a logical high, are open.

It is further pointed out that the light unit control logic 12 does not necessarily expect one of four exact power inputs. It may rather interpret certain power input ranges as corresponding commands. For example, a first voltage range may indicate an armed and charge command, a second voltage range may indicate a charge and illumination command, and a voltage sequence may indicate a shut down command. It is possible that all other power inputs, not falling into any of these three categories, are by default interpreted as a discharge and illumination command. This discharge and illumination command is interpreted as a possible emergency, according to which the third output 123 is set to a logical high. It is pointed out that the commands to the autonomous emergency light unit may be any kind of suitable commands, as long as the power supply controller and the autonomous emergency light unit follow agreed upon conventions.

Figure 3:
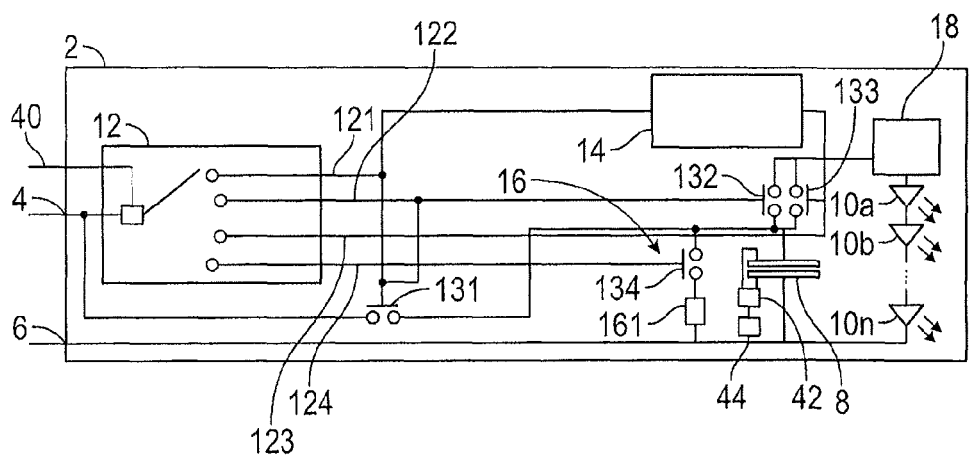
FIG. 3 shows a combined block and circuit diagram of another exemplary autonomous emergency light unit in accordance with the invention.

FIG. 3 shows another exemplary autonomous emergency light unit 2 in accordance with the invention. Much of the light unit 2 of FIG. 3 is identical to the light unit 2 of FIG. 2. A description of like elements is therefore omitted for brevity. The description of FIG. 2 is incorporated fully by reference.

The light unit 2 of FIG. 3 differs from the light unit 2 of FIG. 2 in that it has an additional input, which is part of a control information channel 40. The control information channel 40 is a means of conveying external control information from the power supply controller to the light unit 2. The light unit control logic 12 is coupled to the control information channel 40 for receiving the control commands carried thereon. The power input 4 is still coupled to the first switch 131 and to the light unit control logic 12, because the light unit control logic 12 is still configured to determine the state of no power being provided at the power input 4. As a consequence of the state of no power being provided being detected, the light unit control logic 12 of FIG. 3 also sets the third output 123 to a logical high.

A second difference between the light unit 2 of FIG. 3 and the light unit 2 of FIG. 2 is the provision of a charge status sensor 42 and a charge status indicator 44. The charge status sensor 42 senses the charge on the capacitor 8, e.g. via sensing the voltage between the two plates, and provides said information to the charge status indicator 44. The charge status indicator is configured to communicate a low charge state of the capacitor 8 to the outside of the autonomous emergency light unit 2. For example, the charge status indicator 44 may comprise one or more light sources, such as one or more LEDs, for indicating a low charge of the capacitor 8 to the cabin crew. The charge status indicator 44 may also comprise a transmitter for transmitting said low charge information to the emergency lighting system and/or to the cockpit and/or to a board computer. This communication of information may be done in a wired or wireless way.

It is pointed out that above described two differences between FIG. 2 and FIG. 3 are independent from each other and each of them can be implemented without the other.

Figure 4:
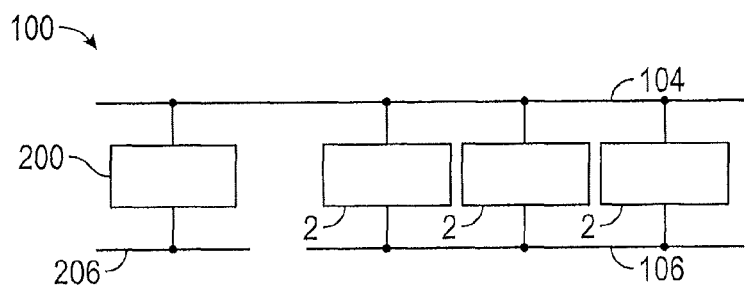
FIG. 4 shows a block diagram of an exemplary emergency lighting system in accordance with the invention.

FIG. 4 shows a block diagram of an exemplary emergency lighting system 100 in accordance with the invention. The emergency lighting system 100 comprises three autonomous emergency light units 2, coupled between a power supply line 104 and ground 106. Further, a power supply controller 200 is coupled between the power supply line 104 and ground 106. This power supply controller 200 receives power from an aircraft power network and control commands from one or more of the cabin crew, the flight crew, an autopilot, and a board computer. Based on these control commands, the power supply controller 150 supplies modulated power signals to the light units 2 via the power line 104, such that the light units 2 receive their operating power as well as their operating commands through the power line 104. The power line 104 functions as a power and information bus between the power supply controller 200 and the autonomous emergency light units 2. The details of the power commands have been discussed above with respect to the light unit 2, being the receiver and processor of the respective commands.

Figure 5:
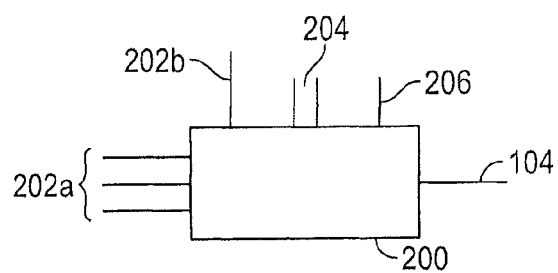
FIG. 5 shows a block diagram of an exemplary power supply controller to be used in an exemplary emergency lighting system in accordance with the invention.

FIG. 5 shows the terminals of an exemplary power supply controller 200 to be used with the exemplary emergency lighting system 100 of FIG. 4. The power supply controller 200 is coupled to the power line 104. It further has an external power input 204, adapted to be coupled to the aircraft power network, a ground terminal 206, a first external control input 202a, coupled to the cockpit for receiving external control information, and a second external control input 202b, coupled to one or more switches in the cabin for receiving external control information from the cabin crew. The first external control input 202a may additionally be coupled to the autopilot or a board computer. There may also be a third and potentially fourth external control input provided for being coupled to the autopilot and the board computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed, but that the invention will include all embodiments falling within the scope of the appended claims.

The invention claimed is:

1. An autonomous emergency light unit for an aircraft, the emergency light unit comprising:
a power input for receiving power from an external power supply,
a rechargeable power source,
at least one LED for illuminating the emergency light unit, and
a light unit control logic configured to operate the emergency light unit in a plurality of operating states as a response to external control information received and processed by the light unit control logic,
wherein the plurality of operating states comprises a discharge and illumination state, with the rechargeable power source being discharged over the at least one LED in the discharge and illumination state, and wherein the light unit control logic is configured to operate the emergency light unit in the discharge and illumination state as a response to no power being provided at the power input;
wherein the light unit control logic is configured to sense the power provided at the power input, with a modulation of the power provided at the power input representing the external control information and with different voltage levels of the power provided at the power input indicating different desired behaviours of the emergency light unit.

2. The autonomous emergency light unit according to claim 1, wherein the light unit control logic is configured to receive external control information through a separate control information channel.

3. The autonomous emergency light unit according to claim 1, wherein the rechargeable power source is a capacitor.

4. The autonomous emergency light unit according to claim 1, wherein the plurality of operating states comprises a charge and illumination state, with the rechargeable power source being charged and the at least one LED being illuminated with the power received at the power input in the charge and illumination state, and wherein the light unit control logic is configured to operate the emergency light unit in the charge and illumination state as a response to external control information comprising a charge and illumination command.

5. The autonomous emergency light unit according to claim 1, wherein the plurality of operating states comprises an armed and charge state, with the rechargeable power source being charged with the power received at the power input in the armed and charge state, and wherein the light unit control logic is configured to operate the emergency light unit in the armed and charge state as a response to external control information comprising an armed and charge command.

6. The autonomous emergency light unit according to claim 5, further comprising an aircraft crash sensor coupled to the light unit control logic, wherein the plurality of operating states comprises a sensed crash state, with the rechargeable power source being charged and the at least one LED being illuminated with the power received at the power input in the sensed crash state, and wherein the light unit control logic and the aircraft crash sensor are configured to operate the emergency light unit in the sensed crash state as a response to external control information comprising the armed and charge command and the aircraft crash sensor sensing a crash behavior characteristic.

7. The autonomous emergency light unit according to claim 6, wherein the aircraft crash sensor is an acceleration sensor.

8. The autonomous emergency light unit according to claim 1, wherein the plurality of operating states comprises a shut down state, with the rechargeable power source being discharged via a power dissipation circuit in the shut down state, and wherein the light unit control logic is configured to operate the emergency light unit in the shut down state as a response to external control information comprising a shut down command.

9. The autonomous emergency light unit according to claim 1, further comprising a power conditioning module (18) coupled between the rechargeable power source and the at least one LED, the power conditioning module being adapted to provide power from the rechargeable power source to the at least one LED with suitable power characteristics.

10. The autonomous emergency light unit according to claim 1, wherein the at least one LED is a plurality of LEDs, coupled in series.

11. The autonomous emergency light unit according to claim 1, further comprising a charge status sensor coupled to the rechargeable power source (8) for sensing a charge status thereof and a charge status indicator coupled to the charge status sensor and configured to indicate the charge status of the rechargeable power source, the charge status indicator being one of a display device and a signal generator coupleable to an external status signal channel.

12. An emergency lighting system for an aircraft, comprising a power supply line and a plurality of autonomous emergency light units according to claim 1, wherein the plurality of autonomous emergency light units are coupled to the power supply line with their respective power inputs.

13. The emergency lighting system according to claim 12, further comprising a power supply controller configured to provide modulated power on the power supply line, with the modulated power carrying the external control information in its modulation.

14. An aircraft comprising an emergency lighting system according to claim 12.

15. The aircraft according to claim 14, wherein the aircraft is a plane or a helicopter or a spacecraft.

* * * * *